April 1, 1969  C. A. ANDRYSICK  3,436,202
VERTICAL INDEX PRESS FOR PRESS FORMING GLASS ARTICLES
Filed Aug. 10, 1965

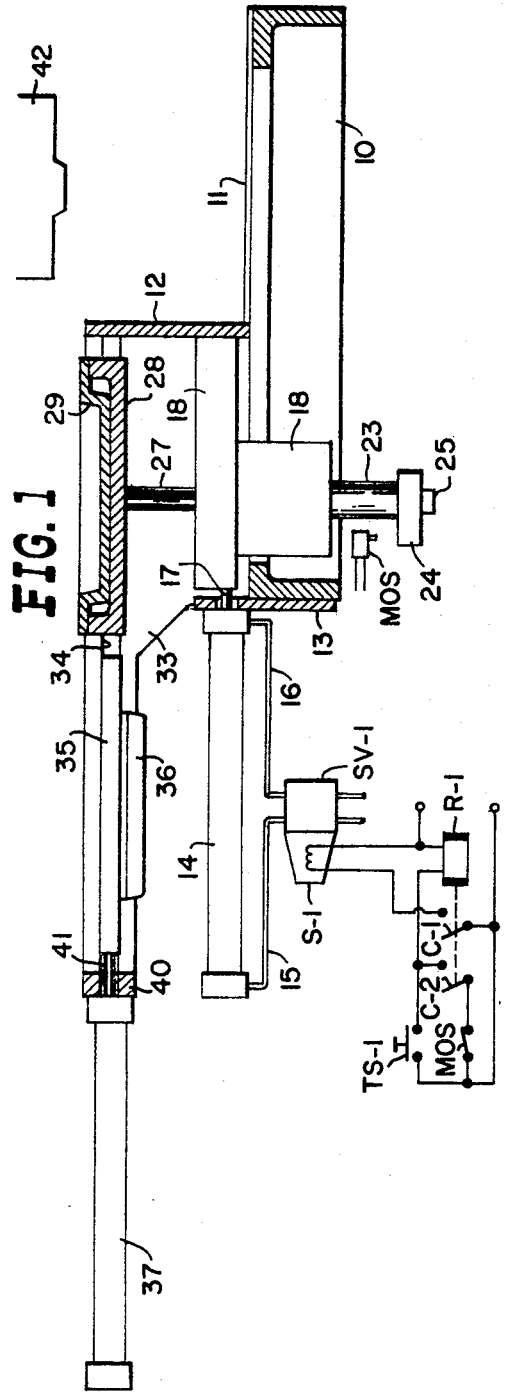

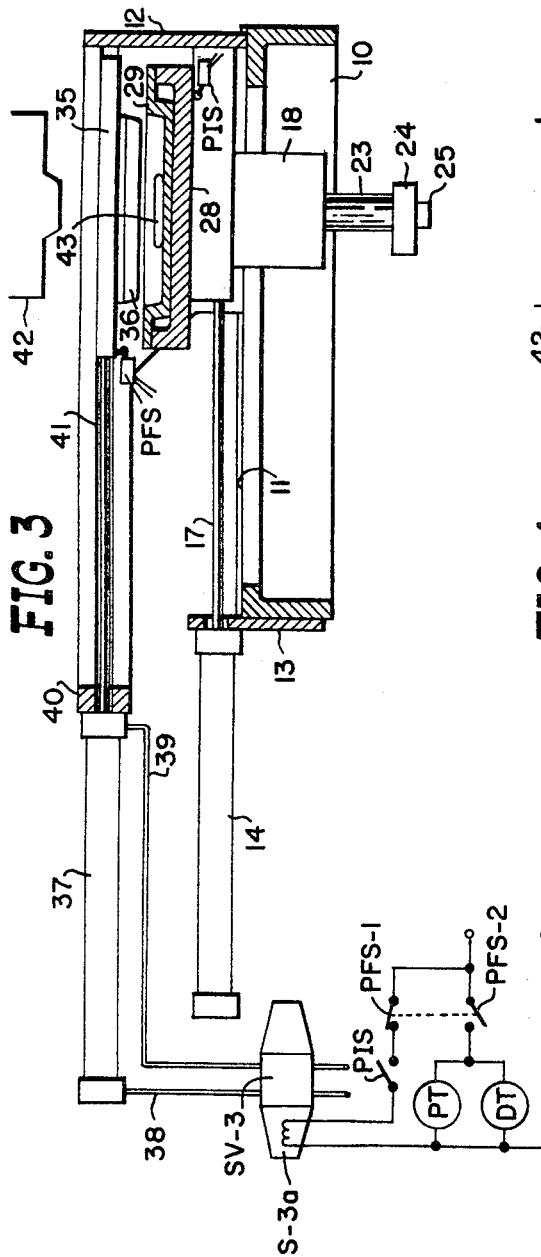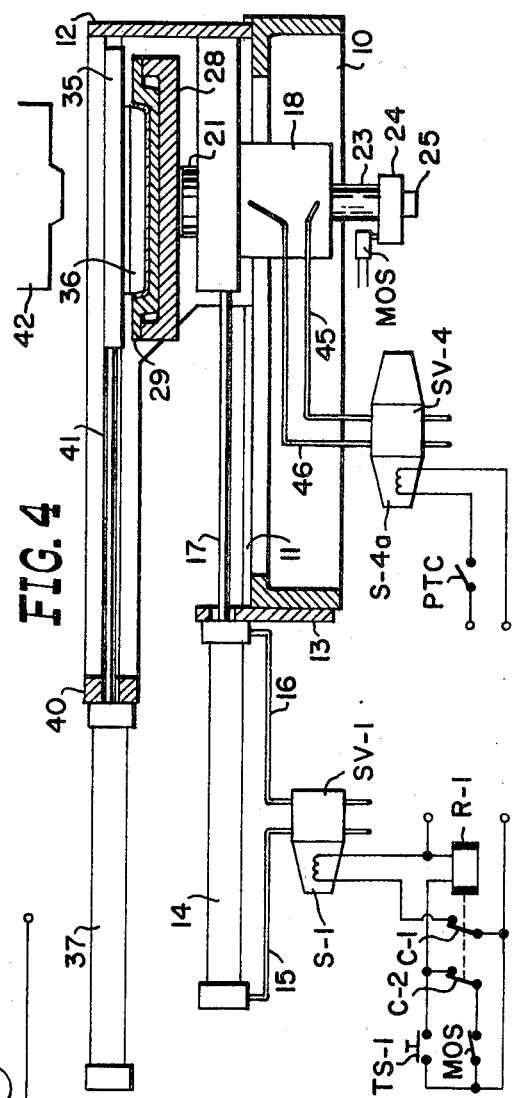

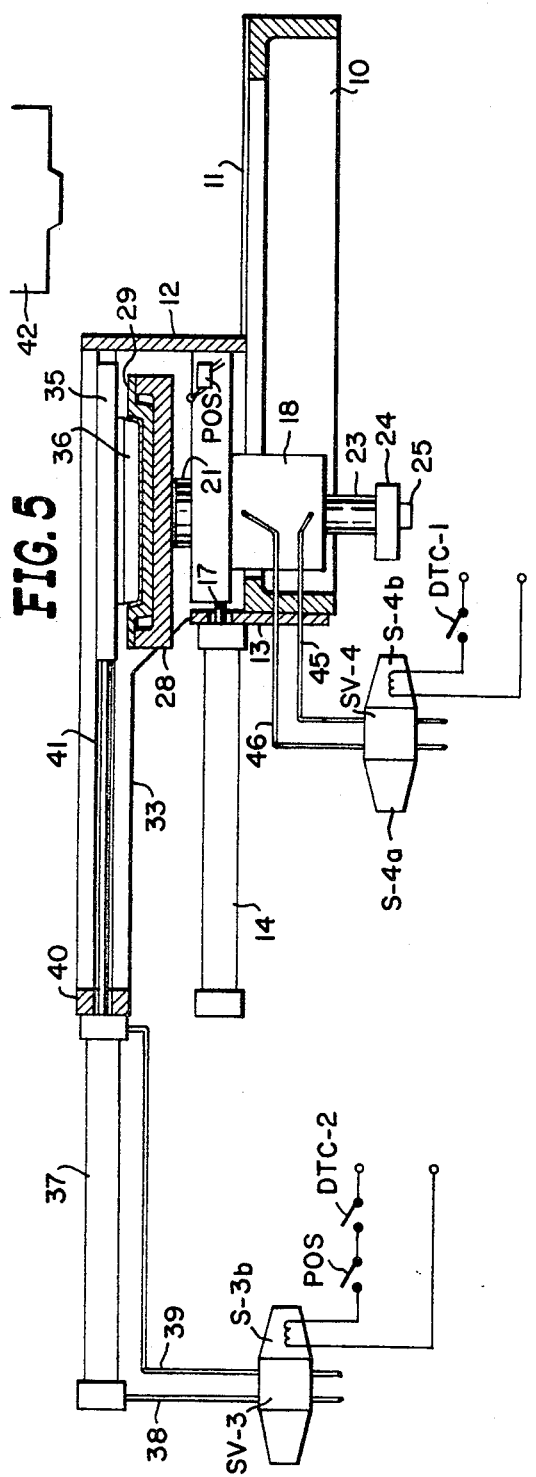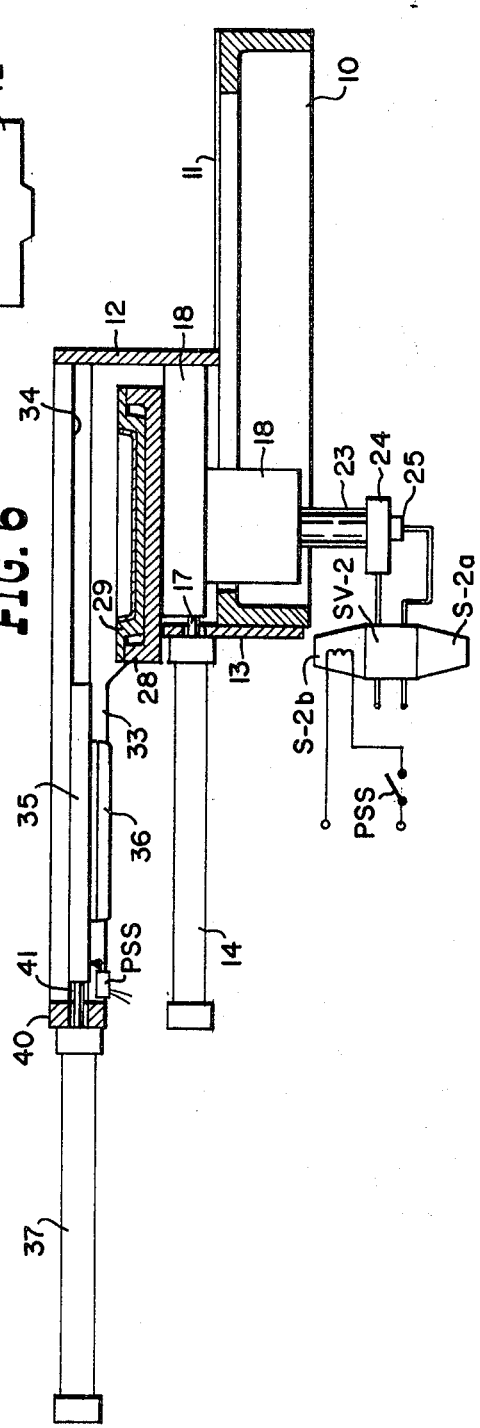

INVENTOR.
Chester A. Andrysick
BY
ATTORNEY

United States Patent Office 3,436,202
Patented Apr. 1, 1969

3,436,202
VERTICAL INDEX PRESS FOR PRESS FORMING GLASS ARTICLES
Chester A. Andrysick, Corning, N.Y., assignor to Corning Glass Works, Corning, N.Y., a corporation of New York
Filed Aug. 10, 1965, Ser. No. 478,561
Int. Cl. C03b 7/00, 11/00, 11/16
U.S. Cl. 65—164      4 Claims

ABSTRACT OF THE DISCLOSURE

Method and apparatus for press-forming glass articles from relatively low viscosity glass by indexing a plunger in floating suspension above a charge mold, raising the mold into pressing engagement with the plunger by means of a pressing cylinder, and lowering the mold after a press and dwell period by means of an index cylinder concentric with said pressing cylinder.

---

This invention relates to an improved method and apparatus for pressing glass articles, and more particularly to a novel method and apparatus for indexing and pressing a molten glass charge to provide improved dimensional uniformity in pressed ware.

In the past it has been customary to press glass articles by supplying a charge of molten glass to a mold, indexing the mold horizontally, and then applying a plunger downwardly into the mold to press the charge into a ware article. This procedure has not been completely satisfactory since the initial horizontal indexing of the mold has a tendency to shift the molten charge contained in the mold from its central position before pressing, thus resulting in checked ware or ware having variable wall thicknesses and/or heights. It has been common practice to utilize a ring upon the mold to provide uniform ware height by limiting the upper extent to which the molten charge may be pressed, however, the ring does not compensate for uneven wall thicknesses produced by an off-centered charge resulting from horizontal indexing. Also ring pressing has the inherent disadvantage of forming a flange or mold mark on the rim of the pressed ware.

Although the instant invention may be performed with the utilization of a ring if desired, a ring is not necessary to produce dimensionally uniform pressed ware. That is, the present invention permits the free pressing of glass articles having substantially uniform wall thicknesses and heights, by maintaining a shaped molten charge centrally positioned within a mold prior to pressing. The ware produced by such free pressing has the additional advantage of having a finished upper rim, free of mold marks and flanges which are inherent with ring pressing.

Basically the invention resides in a free-fall vertically downward positioning of a molten charge centrally of a pressing mold, which mold is only indexed vertically prior to pressing, so as not to disturb the central positionment of the molten charge in the mold. A plunger is indexed horizontally above the mold, and the charge is then pressed to form a ware article. Only after the charge has been pressed and set up as a ware article, is the mold indexed horizontally. Accordingly, since the molten charge is in its central undisturbed position when pressed, the glass flows uniformly outwardly in all directions to produce ware having substantially uniform wall thicknesses and wall heights without necessitating the utilization of a ring positioned upon the mold.

It thus has been an object of the invention to provide a novel method and apparatus for producing pressed ware having improved dimensional uniformity.

A further object of the invention has been to provide novel method and apparatus for free pressing circular glass ware having finished rims with substantially uniform wall thicknesses and heights about its periphery.

An additional object of the invention has been to deliver an undisturbed charge of molten glass from a feeder vertically downwardly directly into the center of a mold positioned therebelow, and maintain such charge centrally of the mold prior to the pressing of such charge into a ware article.

A still further object of the invention has been to provide the indexing of a press mold, containing a centrally positioned charge of molten glass, along a vertical axis so as to facilitate the horizontal indexing of a plunger above such mold for pressing along said vertical axis.

These and other objects of the invention will become apparent to those skilled in the art from the following disclosure and accompanying drawings schematically illustrating method and apparatus for performing the invention wherein:

FIGURE 1 illustrates the positionment of the apparatus for removing or unloading a pressed-formed article with the apparatus in readiness for the start of a cycle.

FIGURE 2 illustrates the loading positionment of the apparatus wherein the pressing mold receives a centrally positioned charge of molten glass.

FIGURE 3 illustrates the downward vertical indexing of the mold and the horizontal indexing of the plunger.

FIGURE 4 illustrates the pressing position of the mold and plunger along the vertical indexing axis.

FIGURE 5 illustrates the dwell position of the mold and plunger, horizontally disposed from the vertical index axis.

FIGURE 6 illustrates the downward indexing of the mold to permit the horizontally-outwardly indexing of the plunger, so that the mold may be again indexed vertically in the position shown in FIGURE 1 for ware take-out.

Figure 7:
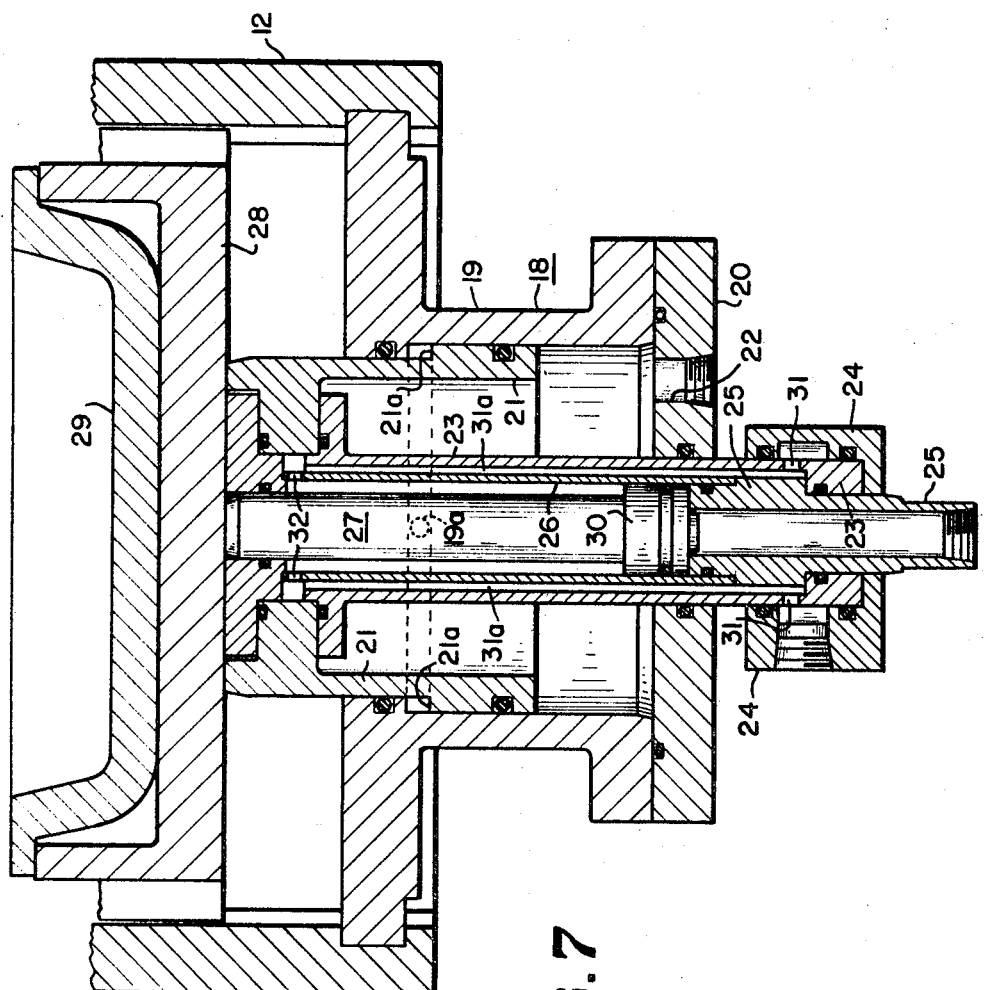
FIGURE 7 is a fragmental cross-sectional view in elevation of a composite cylinder assembly utilized for pressing and vertically positioning the mold.

Referring now to the drawings which not only illustrate apparatus embodying the invention in side elevational views, partially in section, but also schematically illustrate a preferred method of carrying out the invention, a support frame or base member is shown at 10. The base 10 is provided with a pair of upper guide rails or slide bar portions 11 which slidably receive and support a machine index carriage 12. A bracket 13, secured to the base 10, supports a machine index cylinder 14, provided at its opposite ends with suitable fluid passages 15, 16, for slidably moving the carriage 12 along the slide bar portions 11 by means of a piston rod 17.

The carriage 12 supports a combination mold index and pressing cylinder assembly 18. As shown more particularly in FIGURE 7, the assembly 18 includes an outer pressing cylinder 19 provided with a bottom plate 20 for housing a hollow composite pressing cylinder rod 21. The bottom plate 20 is provided with a fluid passage opening 22 for actuating cylinder rod 21 upwardly, and the cylinder 19 is provided with a fluid passage opening 19a, operable upon an offset portion 21a, for actuating rod 21 downwardly. The composite pressing cylinder rod 21 has a hollow sleeve 23, secured to an upper portion thereof, which extends downwardly through an opening in the bottom plate 20. A fluid passage manifold 24 is secured to the lower end of the hollow sleeve 23 and extends radially thereabout. An axial fluid passage pipe 25 is positioned within the lower end of the sleeve 23 and projects outwardly therefrom.

An inner sleeve 26, forming a mold index cylinder, and housing a mold index cylinder rod 27, is positioned concentrically within hollow sleeve 23 between offset portions of axial fluid passage pipe 25 and an upper plate of composite pressing cylinder rod 21. The upper end of mold index cylinder rod 27 is secured to a mold carrier 28 removably retaining a suitable mold 29. The rod 27 is provided at its opposite end with a piston 30, which is actuated on one side by fluid entering the pipe 25 to raise the mold carrier, and accordingly the mold carried thereby. Fluid entering manifold 24 passes through openings 31 in the sleeve 23 and upwardly along a passage 31a, formed between hollow sleeve 23 and inner sleeve 26, and through openings 32 formed at the upper end of sleeve 26, into the cylinder 26 to act upon the upper surface of the plunger 30 so as to lower the mold index cylinder rod 27.

The machine index carriage 12 has an extended support frame 33 provided with a pair of slide guide grooves or recesses 34, slidably retaining a crosshead 35. The crosshead 35 has a plunger 36 secured thereto and movable thereby. A plunger index cylinder 37, provided at its opposite ends with suitable fluid conduits 38, 39, is mounted on an end bracket 40 of the support frame 33 and slides the crosshead 35 within grooves 34 by means of piston rod 41 to operatively position plunger 36 in and remove it from axial alignment with mold 29. A suitable glass feeder 42 is positioned above the base 10 to vertically downwardly deliver a charge of molten glass 43 directly to the center of mold 29 when it is indexed in position below the feeder.

In operation, the machine's operating cycle is initiated with the apparatus in the position shown in FIGURE 1. A timing switch TS–1 is momentarily actuated to energize a control relay R–1 having a pair of contacts C–1 and C–2. The relay contacts C–1 and C–2 are closed upon the energization of relay R–1, and in turn energize the solenoid S–1 of a solenoid operated 4-way valve SV–1 to direct a flow of hydraulic fluid along fluid passage line 15 to the left end of machine index cylinder 14. The machine index cylinder 14 moves the machine index carriage 12 along guide rails 11 of base 10 by means of piston rod 17 to the mold loading position shown in FIGURE 2.

As soon as the machine index carriage 12 comes to rest in the loading position shown in FIGURE 2, with the mold 29 in axial alignment with the orifice of glass feeder 42, a charge 43 of molten glass is preferably forced stream fed vertically downwardly directly into the mold. A second timing switch TS–2 is then momentarily actuated to energize solenoid S–2a of a double solenoid 4-way valve SV–2, to direct a flow of hydraulic fluid into fluid passage manifold 24 so as to act upon the upper surface of piston 30 and lower mold index cylinder rod 27 to move the mold 29 vertically downwardly to the position shown in FIGURE 3.

When the mold is retracted to its lowermost position, as shown in FIGURE 3, a plunger-in switch PIS is actuated by the mold carrier 28. The actuation of the plunger-in switch energizes solenoid S–3a of a 4-way spring centered, double solenoid valve SV–3 to direct flow of hydraulic fluid through fluid conduit 38 to the left-hand end of plunger index cylinder 37. The cylinder 37 moves the crosshead 35 along slide guide grooves 34 by means of piston rod 41 to position the plunger 36 in location above the mold 29. When the plunger arrives in location above the mold, a plunger-float switch PFS is actuated by a portion of the crosshead 35. The plunger float switch is provided with a pair of contact legs, PFS–1 which is normally closed, and PFS–2 which is normally open. Upon actuation of the plunger float switch, normally closed contact leg PFS–1 is opened to deenergize solenoid S–3a of solenoid valve SV–3, and allows the plunger to float in location without the application of fluid pressure. The floating of the plunger 35 permits the use of suitable keys or guides to align the mold and plunger as they engage one another immediately prior to pressing.

The other contact leg PFS–2 of the plunger float switch, which is normally open, is closed by the actuation of the float switch to initiate both a press timer PT and a dwell timer DT. As shown in FIGURE 4, the press timer is provided with a pair of normally open contacts PTC which are closed upon the activation of the press timer to energize solenoid S–4a of a four-way, spring-centered, closed centered double solenoid valve SV–4. The energization of solenoid S–4a permits the flow of hydraulic fluid through fluid conduit 45 to fluid passage opening 22 so as to actuate pressing cylinder rod 21 and move the mold 29 into cooperative engagement with plunger 36 as shown in FIGURE 4. The charge of molten glass 43 is accordingly pressed into the desired ware shape for a given time interval as predetermined by the setting of the press timer PT.

As the mold 29 reaches the position of final press by the upward movement of cylinder 21, a normally closed machine out switch MOS is actuated to an open position to deenergize the coil of relay R–1. Upon the deenergization of relay R–1, contacts C–1 and C–2 are returned to their normally open position thus deenergizing solenoid S–1 of the four-way solenoid valve SV–1, so as to direct flow of hydraulic fluid along fluid passage line 16 to the right end of the machine index cylinder 14. Accordingly, piston rod 17 is retracted so as to move the machine index carriage 12 along guide rails 11 of base 10 to the 12 position shown in FIGURE 5.

When the predetermined time interval of the press timer PT expires, the timer contacts PTC are opened to deenergize solenoid S–4a of solenoid valve SV–4. Accordingly, the spool of the press control valve SV–4 is spring-returned to a closed-center position, locking the pressing cylinder 21 in its position of final press. The pressing cylinder may remain in such dwell position without the application of additional hydraulic fluid until the pre-set period of the dwell timer DT expires, however, a dwell pressure of substantially lesser force than the pressing force is preferably applied to the cylinder 21 during the dwell period by suitable valve means.

The dwell timer DT has a first pair of normally open contacts DTC–1, connected in series with a solenoid S–4b of the four-way press control solenoid valve SV–4, and a second set of normally open contacts DTC–2 arranged in series with a solenoid S–3b of the four-way double solenoid valve SV–3. As the preset dwell timer period expires, any dwell pressure is released and the first set of dwell timer contacts DTC–1 closes to energize coil S–4b of the press control valve SV–4 to direct hydraulic fluid through conduit 46 into opening 19a of pressing cylinder 19 so as to move pressing cylinder rod 21 downwardly to retract the mold carrier 28 and accordingly mold 29 from engagement with the plunger 36. As the mold carrier 28 moves downwardly it contacts a normally open plunger out switch POS which is in series with the solenoid S–3b of the double solenoid valve SV–3 and the second set of dwell timer contacts DTC–2.

The dwell timer contacts DTC–2 are of course closed when the dwell timer period expires, thus preparing the circuit so that when the plunger out switch POS is actuated by the lowering of the mold carrier 28, the solenoid S–3b of the plunger index control valve SV–3 is energized. The energization of the solenoid S–3b directs hydraulic fluid through fluid passage 39 to the right-hand end of plunger index cylinder 37 which moves crosshead 35 along slide guide groove 34 by means of piston rod 41 to position the plunger 36 in its retracted or out position shown in FIGURE 6.

As the plunger 36 reaches its out position, crosshead 35 actuates a normally open plunger safety switch PSS positioned in series with a solenoid S–2b of the double solenoid four-way mold index cylinder valve SV–2. The actuation of solenoid S–2b directs a flow of hydraulic fluid to axial fluid passage pipe 25 so as to actuate piston 30 and move mold index cylinder rod 27 and accordingly carriage 28 and mold 29 upwardly to the position shown in FIGURE 1. The ware then may easily be removed from the mold and the press is again in readiness to repeat the cycle.

Although various types and viscosities of glasses may be utilized with the present invention to produce a multiplicity of ware articles, the following specific example, which is by no means limiting, sets forth the operating parameters for press forming an 8⅝-inch dinner plate from an opal glass. The glass had a delivery temperature of about 1,430° C. with a viscosity of approximately 600 poises. The mold 29 was moved into position directly beneath the feeder 42, and a charge of molten glass was force fed vertically downwardly into the center of the mold. The mold 29 was then indexed downwardly and the plunger 36 moved inwardly in alignment above the mold. Both the mold 29 and plunger 36 are provided with fins and air-cooled so as to maintain them at desired operating temperatures. In the instant illustration, the mold was maintained at approximately 530° C. and the plunger at 430° C. The mold was then moved upwardly for cooperative pressing engagement with the plunger, and the 8⅝-inch plate pressed with a force of approximately 30 pounds per square inch of glass area and with a dwell force of about 11 pounds per square inch. Only after the glass had been formed between the mold and plunger, was the machine indexed to the side so that a new mold could be positioned under the orifice. After the pressing was completed, the mold was indexed downwardly and the plunger retracted outwardly to the side. The mold then moved upwardly and the pressed ware removed therefrom.

It will be understood, of course, that the schematic drawings illustrate the generic concept of the applicant's invention. However, the base 10 may be cruciform so as to facilitate the positioning of a plurality of molds under the feeder 42, or if desired, a plurality of bases 10 may be mounted on a rotating table for indexing under the feeder. Although the now preferred embodiment of the invention has been described together with a specific example thereof, it will be apparent to those skilled in the art that various changes and modifications may be made thereto without departing from the spirit and scope thereof as defined in the appended claims.

I claim:
1. Apparatus for press-forming ware articles trom molten glass which comprises, an open-top mold, means for horizontally positioning said mold beneath an orifice of a glass feeder for receiving a charge of molten glass from the feeder centrally of the mold, first cylinder means for indexing said mold vertically downwardly, a pressing plunger, means for horizontally moving said plunger in axial alignment above said open-top mold, pressing cylinder means concentric with said first cylinder means for moving said mold vertically upwardly into cooperating relationship with said plunger to press the molten charge into a ware article, means for horizontally moving said plunger and said mold while in such cooperating relationship, and means for separating said mold and said plunger to remove the formed ware article.

2. Apparatus for press-forming articles from molten glass which comprises, a base member, a carriage slideably mounted on said base member carrying an open-top mold and a pressing plunger, means for slideably moving said carriage to position said open-top mold in axial alignment with the discharge orifice of a glass feeder, a mold index and pressing cylinder assembly carried by said carriage having a central mold index cylinder means for vertically positioning said open-top mold immediately below the discharge orifice of the glass feeder to receive a charge therefrom and for indexing said mold and such charge vertically downwardly, means for sliding said pressing plunger along said carriage into axial alignment above said open-top mold, and pressing cylinder means concentric with said central mold index cylinder means and forming a part of said mold index and pressing cylinder assembly for moving said mold vertically upwardly into cooperative engagement with said pressing plunger to press the molten glass carried thereby into a ware article.

3. Apparatus as defined in claim 2 wherein solenoid valve means control the flow of fluid pressure to said pressing cylinder means; and timer means, actuated by the positionment of said pressing plunger in axial alignment above said mold, selectively energizes said solenoid valve means to provide desired press and dwell periods while said plunger and mold are in their cooperative engagement.

4. Apparatus as defined in claim 2 wherein said means for sliding said pressing plunger into axial alignment above said mold includes a solenoid-controlled fluid-operated plunger index cylinder, and means for de-activating said plunger index cylinder when said pressing plunger is in substantial axial alignment with said mold so that said plunger may freely float in position above said mold and permit final alignment as said plunger and said mold come into cooperative engagement.

References Cited
UNITED STATES PATENTS 3,293,017 12/1966 Jenkins _____ 65—72
3,334,985 8/1967 Lippman et al. _____ 65—308 X DONALL J. SYLVESTER, *Primary Examiner.*

ARTHUR D. KELLOGG, *Assistant Examiner.*

U.S. Cl. X.R.

65—223, 226, 317